(12) United States Patent  (10) Patent No.: US 7,415,412 B2
Naoi  (45) Date of Patent: Aug. 19, 2008

(54) INFORMATION SYSTEM

(75) Inventor: Kazumi Naoi, Yokohama (JP)

(73) Assignee: Nissan Motor Co., Ltd. (JP)

( * ) Notice: Subject to any disclaimer, the term of this patent is extended or adjusted under 35 U.S.C. 154(b) by 919 days.

(21) Appl. No.: 10/755,223

(22) Filed: Jan. 13, 2004

(65) Prior Publication Data

US 2005/0094475 A1    May 5, 2005

(30) Foreign Application Priority Data

Jan. 23, 2003  (JP)  ............................ 2003-015170

(51) Int. Cl.
*G10L 15/04*  (2006.01)
(52) U.S. Cl. ...................... 704/260; 704/231; 704/251; 704/275; 704/270; 704/256
(58) Field of Classification Search ................ 704/260, 704/270–275, 231, 201, 256, 251
See application file for complete search history.

(56) References Cited

U.S. PATENT DOCUMENTS

| | | | | |
|---|---|---|---|---|
| 5,359,707 A * | 10/1994 | Sato | ............................ | 715/532 |
| 5,729,618 A * | 3/1998 | Fujisawa et al. | ............. | 382/100 |
| 6,161,091 A * | 12/2000 | Akamine et al. | ............ | 704/258 |
| 6,226,614 B1 * | 5/2001 | Mizuno et al. | .............. | 704/260 |
| 6,751,592 B1 * | 6/2004 | Shiga | .......................... | 704/258 |
| 7,167,831 B2 * | 1/2007 | Falcon et al. | ................ | 704/275 |
| 7,225,130 B2 * | 5/2007 | Roth et al. | .................. | 704/270 |
| 2002/0072918 A1 * | 6/2002 | White et al. | ............. | 704/270.1 |

* cited by examiner

*Primary Examiner*—Vijay B Chawan
(74) *Attorney, Agent, or Firm*—McDermott Will & Emery

(57) ABSTRACT

An information system includes an output section to read a character string in received contents aloud, and a memory section to store a rule set to convert input contents to modified contents adapted to text reading. An optimizing section is arranged to covert the input contents to the modified contents according to the rule set, and to cause the output section to read out the modified contents.

13 Claims, 1 Drawing Sheet

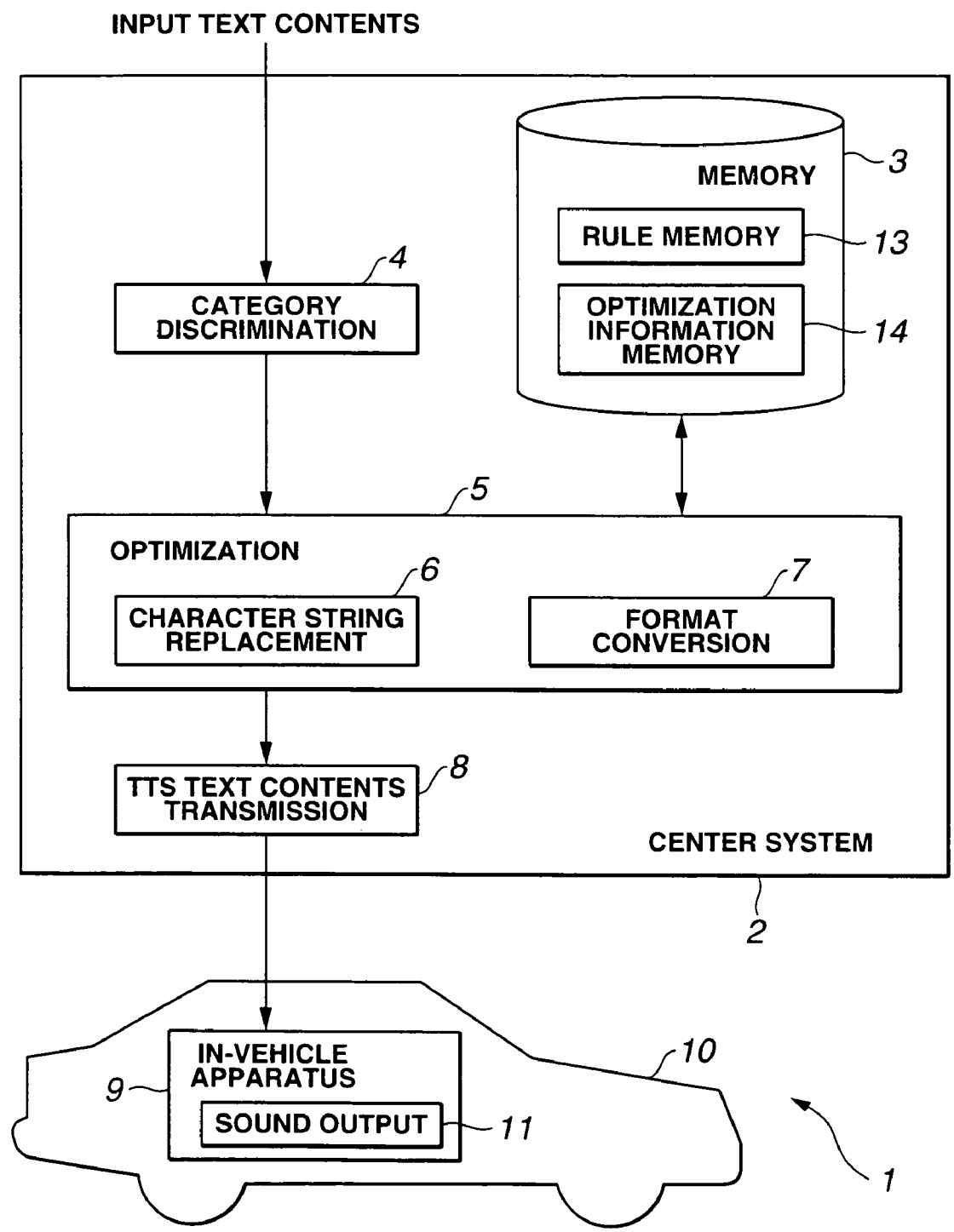

INFORMATION SYSTEM

BACKGROUND OF THE INVENTION

The present invention relates to information system and method for producing speech of input text files and thereby providing audible information.

U.S. Pat. No. 6,226,614 B1 (corresponding to P 11-202884A) shows a system for producing synthetic speech messages.

SUMMARY OF THE INVENTION

It is an object of the present invention to provide information system and method for modifying text contents for production of speech without requiring much of human resources.

According to one aspect of the present invention, an information system comprises: an output section to read out a character string in received contents; a memory section to store a rule set to convert input contents to modified contents adapted to text reading; and an optimizing section to covert the input contents to the modified contents according to the rule set, and to cause the output section to read out the modified contents.

According to another aspect of the invention, an information supplying process comprises: receiving input contents; converting the input contents to modified contents adapted to text reading automatically according to a preliminarily stored rule set; and supplying the modified contents to speak the modified contents aloud.

The other objects and features of this invention will become understood from the following description with reference to the accompanying drawings.

BRIEF DESCRIPTION OF THE DRAWINGS

FIG. 1 is a schematic view showing an information system according to one embodiment of the present invention. embodiment of the present invention.

DETAILED DESCRIPTION OF THE INVENTION

An information system of earlier technology is arranged to supply audible information to drivers and passengers in vehicles by using Text-To-Speech (TTS). TTS is technology for creating audible speech from computer readable text file inputted to TTS application. Input text files are prepared by the following ways. (1) Text contents are prepared from data base in consideration of speech production by TTS. (2) Text contents available on the Web are diverted to the preparation. Text contents prepared by (1) are adequate for speech production mostly. On the other hand, text contents prepared by (2) are adequate for presentation of Web contents, but often inadequate for speech production by TTS.

When, for example, Web contents in the Japanese language (English translation is provided in braces { }) "[ロンドン 20 予選は各地で]{London on the twentieth} サッカーの 2004 年欧州選手権( ユ-ロ 2004) 予選は各地で3 試合を行ない {Three games of qualifying round of Soccer European championships (Euro 2004) were played in various locations}, 9組の首位ウェールズはアウェーでアゼルバイジャンに2–0で快勝, 3戦全勝で2位以下との勝 正規点差を広げた. {Walse at the top in the ninth group won an away game easily against Azerbaijan by 2–0, and increased the point difference from the second and subsequent teams by an undefeated score of three wins}" are inputted to TTS, speech spoken aloud is: 「カッコロンドン ニジュウニチカッコ サッカーノニセンヨネ ンオウシュウセンシュケンカッコユーロニセンヨネンカッコ ヨセンハカクチデサンシアイヲオコナイ, キュウクミノシュイウ ェールズハア ウェーデアゼルバイジャンニニーマイナスゼロデカ イショウ, サンセンゼンショウデニイイカトノカチ テンサヲヒロゲタ.」 {parenthesis London the 20th parenthesis three games of qualifying round of Soccer European championships parenthesis Euro 2004 parenthesis were played in various locations, Walse at the top in the ninth group won an away game easily against Azerbaijan by two minus zero, and increased the point difference from the second and subsequent teams by an undefeated score of three wins}] in this case, "[" and "]" are pronounced as "カッコ" {parenthesis} (pronunciation of symbol character strings inadequate for sound production). Moreover, "2–0" is pronounced as "ニーマイナスゼロ" {two minus zero}(inappropriate pronunciation of predetermined formats).

Thus, most texts contents used in Web contents are not adequate for speech production by TTS. Therefore, the information system of earlier technology requires modification by human operators to adapt text contents to the speech production. The modification includes operations of checking inappropriately pronounced portions by performing speech production of text contents by TTS, and operations of modifying text contents to modify the detected inappropriate portions. Thus, the information system of the earlier technology requires lots of human resources FIG. 1 shows an information system 1 according to one embodiment of the present invention. This information system 1 is a system for providing information to vehicles. Information system 1 includes a center system 2 for transmitting and supplying information to driver and/or passenger of at least one vehicle, and at least one in-vehicle apparatus 9 mounted in a vehicle 10, for receiving the information from center system 2.

Center system 2 includes a category discriminating section 4 determining a category of input text contents inputted to center system 2, a memory section 3 storing a collection of rules for modifying character strings in the input contents to modified character strings suitable for text reading of TTS, an optimizing section 5 to optimize the text contents, and a TTS text contents transmitting section 8 to transmit the optimized or modified text contents to in-vehicle apparatus 9. Optimizing section 5 of this example includes a character string replacement section 6 and a character string format conversion section 7.

Memory section 3 of this example includes a rule memory section 13 storing various rules for modifying character strings as one of first rule group (or first rule set) or second rule group (or second rule set), and an optimization information memory section 14 storing optimization information including information on the order of rules and operations used for optimization in each of categories.

When text contents are inputted to center system 2 from a content provider, category discriminating section 4 identifies the category of the input contents. Then, the character string replacement section 6 and format conversion section 7 in optimizing section 5 select rules for optimization in accordance with information on the category identified by category discrimination section 4, referring to the optimization information stored in optimization information memory section 14; and thereby carry out optimizing operations on the text contents to achieve adequate sound reproduction.

The thus-optimized (modified) text contents for TTS are transmitted by TTS text contents transmitting section 8, to in-vehicle apparatus 9 of vehicle 10. In-vehicle apparatus 9 includes an sound output section 11. This sound output section 11 converts the optimized text contents to audible sound by using TTS, and thereby supplies information to the driver and passengers in vehicle 10 through a loudspeaker system.

Tables I, II and III (at the end of the detailed description of the invention) show rules stored in rule memory section 13 of memory section 3 of this example. By using these rules, character string replacement section 6 and format conversion section 7 perform optimizing operations of text contents in the following manner. Character string replacement section 6 replaces character or charters in text contents, with other character or characters or NULL according to the first rule group stored in rule memory section 13. Format conversion section 7 converts character or characters in text contents, into a form in a character string format suitable for the contents according to the second rule group stored in rule memory section 13. In these tables, <number> and <number string> denote "number" and "number string", respectively (not "<number>" and "<number string>").

Operation No. 1 in Table I provides one rule of the first rule group. The optimizing operation of Operation No. 1 is to replace a character string (such as symbol) undesirable for pronunciation, with NULL, to optimize text contents for automatic production of speech by TTS, as in the following example.

EXAMPLE 1

Replace each of character strings "<" and ">" in text contents, with NULL.

For example, a character string "<今日の天気{today's weather}>" is pronounced by TTS as 「カッコキョウノテンキカッコ{parenthesis today's weather parenthesis}」. The undesired character 「カッコ{parenthesis}」 is read aloud. This character string is modified by the optimizing operation of Operation No. 1, into a character string "今日の天気{today's weather}", and pronounced by TTS as 「キョウノテンキ{today's weather}」.

Other examples of character strings which are not desired for pronunciation are: "(", ")", and "■" (which is used, for example, to emphasize subsequent sentences). By an operation similar to the operation of Example 1, the information system replaces each of "(", ")", and "■" with NULL, and thereby removes "(", ")", and "■" from text contents, for production of adequate speech by TTS.

As one rule of the first rule group, the optimizing operation of Operation No. 4 is to replace linefeed (or line break)(for starting a new line or a new paragraph) in input text contents, with a pause symbol, and thereby to insert a pause (silent pause) in a sentence for optimum production of speech by TTS, as in the following example.

EXAMPLE 2

Replace a linefeed code in text contents, with a pause symbol.

For example, a character string ". . . 川崎市内などで発生しています. (linefeed code)正規の高額カードを購入. . ." {". . . occurring in Kawasaki City. (linefeed code) Purchase a regular high-priced card . . ."} is modified by the optimizing operation of Operation No. 4, into a character string ". . . 川崎市内などで発生しています. (pause symbol)正規の高額カードを購入. . ." {". . . occurring in Kawasaki City. (pause) Purchase a regular high-priced card . . ."}, and pronounced by TTS as 「. . . カワサキシナイナドデハッセイシテイマス (pause)セイキノコウガクカードヲコウニュウ. . . 」 {「 . . . occurring in Kawasaki City. (pause) Purchase a regular high-priced card . . . 」}, with a pause in a proper portion in the speech.

As rule of the first rule group, the optimizing operations of Operation Nos. 11 and 14~24 shown in Table II are to replace abbreviated expressions and symbols in input text contents, with unabbreviated forms for optimum production of speech by TTS, as in the following example.

EXAMPLE 3

Replace "(日{Sun})", "(月{Mon})" and so fourth with the adequate full forms.

For example, a character string "(日{Sun})" is pronounced by TTS as カッコニチカッコ」 {parenthesis Sun parenthesis}, including the unwanted pronunciation of parenthesis. By performing the optimizing operation of No. 14, the information system according to this embodiment rewrites "(日{Sun})" into "日曜日{Sunday}", and pronounces, with TTS, as 「ニチヨウビ」 {Sunday}.

EXAMPLE 4

Replace a wave dash "~" used for indicating a range as in "10~12", with an adequate expression.

For example, a character string "10~12" is pronounced by TTS improperly as ジュウナミセンジュウ」 {ten wave dash twelve}, including the inadequate pronunciation of wave dash. By performing the optimizing operation of No. 24, the information system according to this embodiment rewrites "10~12" into "10 カラ12" {from 10 to 12}, and pronounces, with TTS, as 「ジュウカラジュウカラ」 {from ten to twelve}. This replacement corresponds to replacement of "10~12" with "10 to 12" in the case of English.

As rule of the second rule group, the optimizing operations of Operation Nos. 26, 27 and 35 shown in Table III are performed by format converting section 7, to convert a character string in a prescribed format in text contents into a character string in a modified format suitable for optimum production of speech by TTS, in accordance with a category of the text contents determined by category discriminating section 4, as in the following example.

EXAMPLE 5

Convert a character string such as "0.368" indicating a batting average in contents about baseball, into a character string in an adequate format.

For example, a character string "0.368" is pronounced by TTS as 「テンサンビャクロクジュウハチ」 {point three hundred sixty eight}, in a format inadequate to indicate the batting average. By performing the optimizing operation of No. 27, the information system according to this embodiment rewrites the character string into "3 ワリ6 ブ8 リン", and pronounces, with TTS, as 「サンワリロクブハチリン」 {point three sixty eight}.

EXAMPLE 6

Convert a character string such as "2-0" in a format representing a score in contents relating to sports, into a character string in an adequate format.

For example, a character string "2-0" is pronounced by TTS improperly as 「ニマイナスゼロ」 {two minus zero} in a format inadequate to indicate the score. By performing the optimizing operation of No. 28, the information system according to this embodiment rewrites the character string into "2 タイ 0" {2 to 0}, and pronounces, with TTS, as 「ニタイゼロ」 {two to zero}.

EXAMPLE 7

Convert a character string in a format representing an amount of money, into a character string in an adequate format.

For example, a character string "¥1000" is pronounced by TTS improperly as 「ンセン」 {yen one thousand}. By performing the optimizing operation of No. 36, the information system according to this embodiment rewrites the character string into "1000 ン" {1000 yen}, and pronounces, with TTS, as 「センン」 {a thousand yen}.

When input text contents are HTML contents, the optimizing operations of Operation Nos. 31~34 shown in Table III as rules of the second rule group are performed by format converting section 7, to convert a character string such as a tag character string in HTML contents into a prescribed character string or to remove the character string in HTML contents, for optimum production of speech by TTS, as in the following example.

EXAMPLE 8

Remove a tag character string in HTML contents.

When, for example, HTML contents includes tags, such as "<head>", "<a>", "<img>", "<center>", or a portion enclosed by these tags or a portion (comment portion) enclosed by comment tags, tag character strings are pronounced by TTS uselessly. As to these character strings, by performing the optimizing operations of No. 32~34, the information system according to this embodiment removes tags, portions enclosed by tags and portions enclosed by comment tags, for adequate sound reproduction by TTS.

EXAMPLE 9

Convert "<br>" tag inserting a line break in HTML contents, into a pause symbol by the optimizing operation of Operation No. 35. Therefore, a pause is inserted in a proper position in speech produced by TTS.

By performing these optimizing operations on input HTML contents as shown in Table IV, the information system according to this embodiment converts the input contents into modified text contents suitable for sound reproduction by TTS as shown in Table V, by removing unwanted tag character strings and converting "<br>" tag to a pause symbol. Consequently, the modified text contents are read aloud by TTS as shown in Table VI, in an adequate manner excluding unwanted characters. Other operations in Tables I, II and III are carried out in the same manner.

Character string replacement section 6 and format converting section 7 in optimizing section 5 make reference to the optimization information in optimization information memory section 14 in accordance with the category identified by category discriminating section 4; select rules prescribed in the optimization information from rule memory section 13; and optimize the input text contents by using the selected rules. Optimization information memory section 14 stores optimization information of each category.

When, for example, the category of the input text contents is "general" as in examples 1~4, optimizing section 5 selects rules, such as rules of Operation Nos. 1~26, from rules stored in rule memory section 13 by referring to the optimization information of the category "general"; and optimize the input text contents according to the selected rules. When the category of the input text contents is "sports" as in examples 5 and 6, optimizing section 5 selects rules, such as rules of Operation Nos. 26 and 27, stored in rule memory section 13, and optimize the input text contents.

In the thus-constructed information system according to this embodiment, optimizing section 5 carries out optimizing operations on input text contents (or before-process text contents) inputted to center system 2, according to the first rules and second rules stored in rule memory section 13 of memory section 3, to modify the input contents into modified contents adapted to the speech reproduction by TTS. On the basis of the modified contents (or after-process contents), sound output section 11 in in-vehicle apparatus 9 produces sound by TTS, and thereby supply audible information to driver and/or passenger in the vehicle. This information system converts the input text contents to the modified-contents automatically without need for human resources.

Character string replacement section 6 of optimizing section 5 selects rules from the rules in rule memory section by referring to the optimization information corresponding to the category identified by category discriminating section 4, and performs optimizing operation according to the selected rules. Therefore, a character string inadequate for audible speech reproduction in the before-process contents is replaced with a prescribed adequate character string as in example 1, so that the speech spoken aloud includes no pronunciation of unwanted symbols, and the naturalness is increased.

Furthermore, format converting section 7 in optimizing section 5 refers to the optimization information for the category of the input contents identified by category discriminating section 4, and selects rules from the rules in rule memory section 13. Therefore, a character string format or form of expression in the before-process contents is converted into an adequate character string format or expression form adequate in the category of the contents for adequate speech production by TTS.

Optimization information memory section 14 of memory section 3 stores information on the order of application of rules on text contents for optimization, and information on different optimizing operations. By using such optimization information selected in accordance with the category of contents, optimizing section 5 converts before-process text contents into modified text contents adequate for the contents category.

The information system according to the embodiment is a system for providing various information to vehicles. However, the present invention is not limited to such an information system for vehicles. The illustrated example treats a Japanese speaking information system. However, the present invention is not limited to the Japanese language system. The information system and method may be for English or other languages.

In the illustrated embodiment, section 3 can serve as means for storing a rule set to convert input contents to modified contents adapted to text reading; section 5 can serve as means for converting the input contents to the modified contents according to the rule set; and section 8 can serve as means for supplying the modified contents to speak the modified contents aloud.

This application is based on a prior Japanese Patent Application No. 2003-015170 filed on Jan. 23, 2003. The entire contents of this Japanese Patent Applications No. 2003-015170 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

TABLE 1

RULES

| NO. | OPERATION | PRONUNCIATION |
|---|---|---|
| 1 | Remove prescribed symbol string in text contents. | (Not pronounced) |
| 2 | Remove prescribed symbol string from text contents if similar symbols follow successively. | (Not pronounced) |
| 3 | Remove linefeed | (Not pronounced) |
| 4 | Replace linefeed with pause symbol | (Pause) |
| 5 | Remove half-size space (corresponding to the size of en quad) and full-size space (corresponding to the size of em) | (Not pronounced) |
| 6 | Replace half-size space and full-size space with pause symbol (A) | (Pause-Pattern A) |
| 7 | Replace half-size space and full-size space with pause symbol (B) | (Pause-Pattern B) |
| 8 | Remove "{", "}", "(", ")", " [", " ] ", "[" and "]" | (Not pronounced) |
| 9 | Replace "{", "}", "(", ")", " [", " ] ", "[" and "]", with pause symbol (A) | (Pause-Pattern A) |

TABLE II

| NO. | OPERATION | PRONUNCIATION |
|---|---|---|
| 10 | Replace "{", "}", "(", ")", " [", " ] ", "[" and "]", with pause symbol (B) | (Pause-Pattern B) |
| 11 | Replace "~" with "から{corresponding to "to" in English}" | カラ{kara in romaji} |
| 12 | Replace "<" and "<" with "·". | (Pause) |
| 13 | Replace ">" and ">" with "·". | (Pause) |
| 14 | Replace "(日{Sun})" with "日曜日{Sunday}" | ニチヨウビ{nichiyoubi in romaji} |
| 15 | Replace "(月{Mon})" with "日曜日{Monday}" | ゲツヨウビ{getsuyoubi in romaji} |
| 16 | Replace "(火{Tue})" with "火曜日{Tuesday}" | カヨウビ{kayoubi in romaji} |
| 17 | Replace "(水{Wed})" with "水曜日{Wednesday}" | スイヨウビ[suiyoubi in romaji] |
| 18 | Replace "(木{Thu})" with "木曜日{Thursday}" | モクヨウビ{mokuyoubi in romaji} |
| 19 | Replace "(金{Fri})" with "金曜日{Friday}" | キンヨウビ{kinyoubi in romaji} |
| 20 | Replace "(土{Sat})" with "土曜日{Saturday}" | ドヨウビ{doyoubi in romaji} |
| 21 | Replace "(祭{Hol})" with "祭日[Holiday]" | サイジツ{saijitu in romaji} |

TABLE II-continued

| NO. | OPERATION | PRONUNCIATION |
|---|---|---|
| 22 | Replace "(休{Off})" with "休日{Offday}" | キュウジツ{kyujitu in romaji} |
| 23 | Replace "(祝{Fet})" with "祝日{Fete day}" | シュクジツ[shukujitu in romaji] |
| 24 | Replace "<number>~<number>" with "<number>から{corresponding to "to" in English}<number>" | <number>から{kara in romaji}<number> |
| 25 | Replace "=" and "=" with "·". | (Pause) |

TABLE III

| NO. | OPERATION | PRONUNCIATION |
|---|---|---|
| 26 | Replace "<number> <number> <number>" with "<number>わり{wari in romaji meaning one tenth}<number>ぶ{bu in romaji meaning one hundredth}<number>りん{rin in romaji meaning one thousandth}". | <number>ワリ{wari in romaji}<number>ブ{bu in romaji}<number>リン{rin in romaji} |
| 27 | Replace "<number>-<number>" with "<number>たい{tai in romaji meaning versus}<number>". | <number>タイ{tai in romaji}<number> |
| 28 | Replace ". (half-size and full-size)" with ", ". | (Pause) |
| 29 | Replace linefeed with "。 (punctuation mark)". | (Pause) |
| 30 | Replace "! (half-size and full-size)" with "。 (punctuation mark)". | (Pause) |
| 31 | Remove prescribed HTML tags. | (Not pronounced) |
| 32 | Remove a portion between <head> and </head>. | (Not pronounced) |
| 33 | Remove a portion between <a> and </a>. | (Not pronounced) |
| 34 | Replace <br> tag with pause symbol. | (Pause) |
| 35 | Replace "¥<number string>" with "<number string>エン{yen}". | <number string>エン{yen} |
| 36 | Replace "$<number string>" with "<number string>ドル{doru in romaji meaning dollar}". | <number string>ドル{doru in romaji} |
| 37 | Replace "<number string>° C." with "セッシ{Celsius}<number string>ド{degrees}" | セッシ<number string>ド |
| 38 | Replace "<number string A>/<number string B>" with "<number string B>ブンノ{bunno in romaji}<number string A>. | <number string B>ブンノ{bunno in romaji}<number string A> |

TABLE IV

Input HTML contents

<HTML>
<HEAD>

<TITLE>開発者の声 </TITLE>

<META http-equiv="content-type"content="text/html; charset=Shift_JIS">
</HEAD>
<BODY bgcolor="#FFFFFF" text="#000000" link="#0000FF" alink="#FF0000" vlink="#FF0000"
<CENTER>

開発者の声 <BR>

TABLE IV-continued

Input HTML contents

```
<HR color="#24B6FF">
<IMG src="IMG/01_1.gif"><BR>
```
日産 太郎 <BR>

日産自動車株式会社 <BR>

新型キューブ <BR>

チーフプロダクトスペシャリスト <BR><BR>

```
</CENTER>
```
キューブにとって今回が初めてのフルモデルチェンジとなります。初代キューブは「コンパクトでハイトなワゴン」という新しいカテゴリーを開拓しました。

`<BR>`

今では若い男性を中心に年齢、性別を超えた幅広い層のお客様から評価をいただき、歴史はまだ浅いのですが、この4年間でキューブDNAと呼べるものが確立できたと思っています。 `<BR>` キューブDNAとしては、シンプルでさりげないスタイリング、コンパクトカーとしての運転のしやすさ、居住性のよさ、乗降性のよさが挙げられます。今回のフルモデルチェンジではそれらをいっそう強化しながら、より今の若いひとの価値観、ライフスタイルに合うクルマをめざしました。

```
<CENTER>(1/3)<BR>
    <A href="voice01_2.html">次へ </A><BR>
    <A href="index.html">開発者の声 TOP</A><BR>
</CENTER>
<HR color="#24B6FF">
<A href="../../index.html"accesskey="#">#cubcTOP</A><BR>
<A href="../../../../index.html"accesskey="*">
    *羅針盤 TOP</A>

</BODY>
</HTML>
```
The following is the above HTML contents including English translation in braces { }.
```
{<HTML>
<HEAD>
    <TITLE> {developer's voice}</TITLE>
```
開発者の声
```
<META http-equiv="content-type"content="text/html;
charset=Shift_JIS">
</HEAD>
<BODY bgcolor="#FFFFFF" text="#000000" link="#0000FF"
alink="#FF0000" vlink="#FF0000">
<CENTER>
```

開発者の声 {developer's voice}<BR>

```
<HR color="#24B6FF">
<IMG src="IMG/01_1.gif"><BR>
```
日産 太郎

{Nissan Taro}<BR>

日産自動車株式会社

{Nissan Motor CO., Ltd.}<BR>

新型キューブ

{New Model CUBE}<BR>

チーフプロダクトスペシャリスト

{Chief Product Specialist}<BR><BR>

```
</CENTER>
```

キューブにとって今回が初めてのフルモデルチェンジとなります。

{For CUBE, this is the first full model change.}初代キューブは「コンパクトでハイトなワゴン」という新しいカテゴリーを開拓しました。{First generation Model CUBE opened up a new category of a compact, tall wagon.}<BR>

今では若い男性を中心に年齢、性別を超えた幅広い層のお客様から評価をいただき、歴史はまだ浅いのですが、この4年間でキューブDNAと呼べるものが確立できたと思っています。{Now, CUBE has received favorable appraisal from customers of young male mostly and wide varieties of other classes beyond ages and gender, and we think what can be called CUBE DNA can be established during these four years though the history is still short.} <BR>キューブDNAとしては、シンプルでさりげないスタイリング、コンパクトカーとしての運転のしやすさ、居住性のよさ、乗降性のよさが挙げられます。{As CUBE DNA, there are simple and casual styling, ease in maneuvering, good interior comfort, and ease in getting on and off.}今回のフルモデルチェンジではそれらをいっそう強化しながら、より今の若いひとの価値観、ライフスタイルに合うクルマをめざしました。{In the full model change of this time, we have aimed to further enhance these features and to produce a car more suitable to sense of value and life style of young people.}
```
<CENTER>(1/3)<BR>
    <A href="voice01_2.html">次へ {Next}</A><BR>
```

TABLE IV-continued

Input HTML contents

```
<A href="index.html">開発者の声 {Developer's
Voice}TOP</A><BR>
</CENTER>
<HR color="24B6FF>
<A href="../../index.html"accesskey="#">#cubcTOP</A><BR>
<A href="../../../../index.html"accesskey="*">

*羅計盤
{RASHINBAN, Nissan official web site}TOP</A>

</BODY>
</HTML>}
```

TABLE V

Modified text contents

開発者の声(ポーズ)

(ポーズ)

日産 太郎

日産自動車株式会社（ポーズ）

新型キューブ（ポーズ）

チーフプロダクトスペシャリスト（ポーズ）(ポーズ)

キューブにとって今回が初めてのフルモデルチェンジとなります。初代キューブはコンパクトでハイトなワゴンという新しいカテゴリーを開拓しました。(ポーズ)今では若い男性を中心に年齢、性別を超えた幅広い層のお客様から評価をいただき、歴史はまだ浅いのですが、この4年間でキューブDNAと呼べるものが確立できたと思っています。(ポーズ)

キューブDNAとしては、シンプルでさりげないスタイリング、コンパクトカーとしての運転のしやすさ、居住性のよさ、乗降性のよさが挙げられます。今回のフルモデルチェンジではそれらをいっそう強化しながら、より今の若いひとの価値観、ライフスタイルに合うクルマをめざしました。

1/3(ポーズ)

(ポーズ)

The following is English translation of the above modified text contents.
{Developer's voice (pause)
(pause)
Nissan Taro
Nissan Motor CO., Ltd. (pause)

TABLE V-continued

Modified text contents

New Model CUBE (pause)
Chief Product Specialist (pause) (pause)
For CUBE, this is the first full model change. First generation
Model CUBE opened up a new category of a compact, tall wagon.
(pause) Now, CUBE has received favorable appraisal from customers
of young male mostly and wide varieties of other classes
beyond ages and gender, and we think what can be called
CUBE DNA can be established during these four years though the
history is still short. (pause) As CUBE DNA, there are simple and
casual styling, ease in maneuvering, good interior comfort, and
ease in getting on and off. In the full model change of this time,
we have aimed to further enhance these features and to produce a
care more suitable to sense of value and life style of young people.
1/3 (pause)
(pause)
(pause)}

TABLE VI

Pronunciation of modified text contents by TTS

カイハツシャノコエ(ポーズ) (ポーズ)ニッサン タロウ (ポーズ)ニッサンジド

ウシャカブシキカイシャ(ポーズ) シンガタキューブ (ポーズ) チーフプロダク

トスペシャリスト（ポーズ）(ポーズ) キューブニトッテコンカイガハジメテノ

フルモデルチェンジトナリマス。ショダイキューブハコンパクトデハイトナワ

ゴン トイウアタラシイカテゴリーヲカイタクシマシタ。(ポーズ) イマデハワカ

イダンセイヲチュウシンニネンレイ、セイベツヲコエタハバヒロイソウノオキ

ャクサマカラヒョウカヲイタダキ、レキシハアサイノデスガ、コノヨネンカン

デキューブディーエヌエートヨベルモノガカクリツデキタトオモッテイマス。

(ポーズ) キューブディーエヌエートシテハ、シンプルデサリゲナイスタイリン

グ、コンパクトカートシテノウンテンノシヤスサ、キョジュウセイノヨサ、ジ

ョウコウセイノヨサガアゲラレマス。コンカイノフルモデルチェンジデハサラ

ニソレラヲイッソウキョウカシナガラ、ヨリイマノワカイヒトノカチカン、ラ

イフスタイルニアウクルマヲメザシマシタ。サンブンノイチ (ポーズ)(ポーズ)(ポーズ)

{in romaji: kaihatusha no koe (pause)(pause) Nissan Taro (pause)
Nissan jidousha kabushiki kaisha (pause) singata kyubu (pause)
chifu purodakuto supeshiarisuto (pause)(pause) kyubu ni
totte konkaiga hajimeteno furumoderuchenji to narimasu. shodai
kyubu ha konpakuto de haitona wagon toiu atarashii kategori wo
kaitakushimasita. (pause) imadeha wakai dansei wo chushinn ni
nenrei seibetu wo koeta habahiroi souno okyakusama kara hyouka
wo itadaki, rekishi ha mada asai nodesuga, kono yonenkan de
kyubu DNA toyoberumonoga kakuritsu dekita to omotteimasu.
(pause) kyubu DNA toshiteha sinpurude sarigenai sutairingu
konpakuto ka toshiteno unten no shiyasusa kyojuuseinoyosa
joukousei noyosa ga ageraremasu. konkaino
furumoderuchenjideha sorerawo issou kyoukashinagara, TABLE VI-continued Pronunciation of modified text contents by TTS yoriimanowakaihitono kachikan, raifusutairu ni au kuruma wo mezashimasita sanbunnoichi (pause)(pause)(pause)}

What is claimed is:

1. An information system comprising:
an output section to read out a character string in received contents;
a memory section to store a rule set to convert input contents to modified contents adapted to text reading; and
an optimizing section to covert the input contents to a the modified contents according to the rule set, and to cause the output section to read out the modified text contents,
wherein the memory section includes a rule memory section to store a character string replacement rule group to replace an input character string in the input contents with a modified character string for the modified contents; and the optimizing section includes a character string replacing section to replace the input character string in the input contents with the modified character string for the modified contents according to the character string replacement rule group, and to cause the output section to read out the modified character string.

2. The information system as claimed in claim 1, wherein the memory section includes a rule memory section to store a format conversion rule group to convert an input format in the input contents to a modified format for the modified contents; and the optimizing section includes a character string format converting section to convert the input format in the input contents to the a modified format for the modified contents according to the format conversion rule group, and to cause the output section to read out the modified contents in the modified format.

3. The information system as claimed in claim 1, wherein the information system further comprises a category discriminating section to discriminate a category of the input contents; the memory section comprises an optimization information memory section to store optimization information including information on rules selected from the rule set in dependence on the category, and an order of application of the rules selected from the rule set; and the optimizing section is configured to covert the input contents to the modified contents according to rules selected from the rule set in dependence on the category of the input contents by using the optimization information stored in the optimization information memory section.

4. The information system as claimed in claim 3, wherein the category discriminating section is configured to discriminate a sports category from another category; the optimization information memory section stores the optimization information including information on rules selected for the sports category, and the order of application of the rules selected for the sports category; and the optimizing section is configured to covert the input contents of the sports category to the modified contents according to the rules selected from the rule set in dependence on the sports category of the input contents by using the optimization information stored in the optimization information memory section.

5. The information system as claimed in claim 1, wherein the output section is mounted on a vehicle.

6. The information system as claimed in claim 5, wherein the information system comprises a center system which includes the memory section; the optimizing section; and a transmitting section to transmit the modified contents to vehicles each equipped with the output section.

7. The information system as claimed in claim 1, wherein the character string replacement rule group comprises a character string replacement rule to remove an HTML tag from a character string in HTML contents.

8. The information system as claimed in claim 1, wherein the character string replacement rule group comprises a character string replacement rule to replace a character string of abbreviated expression with a character string in an unabbreviated form.

9. An information supplying process comprising:
receiving input contents;
converting the input contents to modified contents adapted to text reading automatically according to a preliminarily stored rule set which includes a character string replacement rule to replace a character string in the input contents with a modified character string for the modified contents; and
supplying the modified contents to speak the modified contents aloud.

10. The information supplying process as claimed in claim 9, wherein the information supplying process further comprises:
identifying a category of the input contents; and
selecting rules from the rule set in accordance with the category, for use for converting the input contents to the modified contents.

11. The information supplying process as claimed in claim 9, wherein the modified contents is supplied to speak the modified contents aloud by transmitting the modified contents to remote terminals.

12. An information system comprising:
means for storing a rule set to convert input contents to modified contents adapted to text reading, the rule set including a character string replacement rule to replace a character string in the input contents with a modified character string for the modified contents;
means for converting the input contents to the modified contents according to the rule set; and
means for supplying the modified contents to speak the modified contents aloud.

13. The information system as claimed in claim 1, wherein the character string replacement rule group comprises a character string replacement rule to replace a prescribed symbol character in a character string with NULL so that the symbol character is not pronounced.

* * * * *